(12) United States Patent
Messmer et al.

(10) Patent No.: US 6,866,203 B2
(45) Date of Patent: Mar. 15, 2005

(54) METHOD AND APPARATUS FOR SIZING AN ENVIRONMENTAL CONTROL SYSTEM

(75) Inventors: Craig Messmer, St. Louis, MO (US); Seden Kalyoncu, St. Louis, MO (US)

(73) Assignee: Unico, Inc., St. Louis, MO (US)

( * ) Notice: Subject to any disclaimer, the term of this patent is extended or adjusted under 35 U.S.C. 154(b) by 6 days.

(21) Appl. No.: 10/375,564

(22) Filed: Feb. 26, 2003

(65) Prior Publication Data

US 2004/0164172 A1 Aug. 26, 2004

(51) Int. Cl.[7] ............................................... F24F 7/00
(52) U.S. Cl. ...................................... 236/49.3; 434/72
(58) Field of Search ................. 236/49.3, 94; 62/125; 165/11.1; 434/72

(56) References Cited

U.S. PATENT DOCUMENTS

| | | | |
|---|---|---|---|
| 4,784,212 A | 11/1988 | Brimer et al. | ............ 236/46 R |
| 5,071,065 A | 12/1991 | Aalto et al. | ................ 236/49.3 |
| 5,467,287 A | 11/1995 | Wenner et al. | ......... 62/116.6 X |
| 5,812,423 A | 9/1998 | Maisotsenko et al. | .... 137/10 X |
| 5,822,227 A | 10/1998 | Ishikawa et al. | ....... 236/49.3 X |
| 5,973,662 A | 10/1999 | Singers et al. | .............. 345/112 |
| 6,058,260 A * | 5/2000 | Brockel et al. | ........ 395/500.25 |
| 6,134,511 A | 10/2000 | Subbarao | ....................... 703/6 |
| 6,508,960 B1 * | 1/2003 | Ohmer et al. | ........... 423/508 Y |

OTHER PUBLICATIONS

Strock et al pp. 1–164, 1–165 Handbook of Air Conditioning and Ventilation, 1959.*

Unichiller From The Unico System, Supplemental Instructions, Unichiller Supplemental Bulletin/Sep. 2001, © 1998–1999 Unico, Inc.

UniSpot Installation with 4–inch Duct Branch Runs; Technical Note; Oct. 2001; The Unico System.

* cited by examiner

*Primary Examiner*—Harry B. Tanner
(74) *Attorney, Agent, or Firm*—Thompson Coburn LLP

(57) ABSTRACT

A method is provided for sizing an environmental control system for controlling a temperature of a target. The method comprises the steps of: identifying the target that is to be temperature controlled by the environmental control system; selecting a desired temperature of the target that is to be temperature controlled; and determining optimal characteristics of the environmental control system. Preferably, the step of determining optimal characteristics of the environmental control system includes referring to a nomograph that charts numerical relationships of a plurality of variables. Preferably, variables charted on the nomograph include a temperature of discharge air that is to be discharged from the environmental control system, a temperature of ambient air surrounding the target, a distance between a discharge portion of the environmental control system and the target, and a volumetric flow rate of the discharge air.

7 Claims, 2 Drawing Sheets

METHOD AND APPARATUS FOR SIZING AN ENVIRONMENTAL CONTROL SYSTEM

BACKGROUND OF THE INVENTION

The present invention relates to designing environmental control systems and, more particularly, to sizing spot cooling and heating systems for achieving and maintaining localized thermal control.

Spot cooling is the cooling of a specific target or area within a room, factory or other space, by delivering cool air directly to the target or "spot" that needs to be cooled. Similarly, spot heating is the heating of a specific target or area within a room, factory or other structure, by delivering warm air directly to the target or "spot" that needs to be heated. In both cases, because the cooling/heating air is delivered directly to the target or spot that needs to be temperature controlled, effective thermal control of the target or spot can be achieved without the expensive and inefficient undertaking of cooling or heating the entire room, factory or other space in which the target is located.

Spot cooling and heating typically involve only minimal installation and are particularly beneficial in situations where it would unduly expensive or inefficient to cool or heat by standard air-conditioning or heating systems. For example, spot cooling and heating systems are commonly used in industrial environments, such as large, open areas in factories and warehouses. Spot cooling and heating systems are ideal in such applications because only the target that needs cooling (or heating) is cooled (or heated), not the entire room, building or other large space in which the target is located. However, their uses are not necessarily limited to industrial environments. Spot cooling and heating systems may also be used in commercial and residential environments, such as offices, computer rooms, tents, boardrooms and homes. In addition, spot cooling and heating systems are useful in outdoor events, and are commonly used as emergency backups. Also, typically, spot cooling and heating systems are relatively adaptable and flexible, which permits customization to suit a particular target's needs, and permits reconfiguration when targets change, e.g., when workers in a production line move within their stations or as the production line is modified.

Thus, spot cooling and spot heating provides an effective and relatively inexpensive solution to maintaining thermal comfort and safety, and eliminates the need to air condition or heat an entire factory floor or other ambient space in which a target is located. However, it is still necessary for a design engineer, plant manager or HVAC technician to design and/or select a spot cooling or spot heating system of appropriate size and capacity for a given application. There is no "one size fits all" solution that will be optimal in all situations. Various factors need to be considered by the design engineer, plant manager or technician which selecting an appropriate spot cooling or heating system, such as the desired temperature of the target, the temperature of discharge air that is to be discharged from the spot cooling or spot heating system toward the target, the temperature of the ambient air surrounding the target, the distance between the discharge duct(s) of the spot cooling or spot heating system and the target (sometimes referred to as "throw"), the desired coverage area, the volumetric flow rate of the discharge air, the number and relative location(s) of targets to be temperature controlled by the system (e.g., the number of workers or workstations), and the humidity and air currents of the ambient air surrounding the target. Of course, depending on the particular application and its unique needs, other factors may need to be considered by the design engineer, plant manager or technician, but these are believed by the inventors to be the primary factors that should be considered in designing and sizing a spot cooling or heating system.

Conventionally, to size and select a proper spot cooling system for a given application, the design engineer, plant manager or technician determines the appropriate size, capacity and other parameters of the system by utilizing known principles of fluid mechanics, including a variety of complex mathematical equations, to manually calculate optimal parameters for each given application. Even if the designer possesses the necessary background and knowledge in the art of fluid mechanics and HVAC system design, the process of manually calculating all of the optimal parameters for every possible system variation of a given application would be cumbersome, time consuming, and potentially cost-prohibitive. Unfortunately, what sometimes happens in practice is that the engineer, plant manager or technician attempts to select system parameters by guessing what parameters will be optimal or by trial and error, either because the person designing or selecting the system does not have the necessary background and knowledge in the art of fluid mechanics or HVAC design or because the person does not want to take the time and effort that would be necessary to manually calculate the optimal parameters. Occasionally, the person designing or selecting the system will simply "over design" to ensure that the resulting system clearly has the capacity to achieve the desired result for a given application, but this defeats at least some of the reasons for using spot cooling and heating systems over conventional HVAC systems in the first place (e.g., cost savings, efficiency, cooling the worker instead of the workspace, etc.).

Thus, there is a need for a less cumbersome, less expensive and more efficient manner of determining optimal characteristics of an environmental control system, such as a spot cooling or spot heating system, without the need to process complex mathematical equations or navigate complicated fluid mechanics principles, to manually calculate optimal system parameters for each given application or variation thereof.

SUMMARY OF THE INVENTION

It is therefore an object of the present invention to provide a cost-effective and efficient method for sizing and determining other optimal characteristics of an environmental control system, such as a spot cooling or spot heating system. A related object of the present invention is to provide a method for determining optimal characteristics of an environmental control system, without resorting to the traditional manner of manually processing complex mathematical equations or navigating complicated fluid mechanics principles to calculate such parameters for each system configuration or variation thereof. It is also an object is to provide a visual reference tool that can be used by design engineers, plant managers and technicians to efficiently size and determine other optimal characteristics of an environmental control system, in lieu of the traditional manner of manually processing complex mathematical equations based on fluid mechanics principles to determine proper design specifications. Another related object is to provide a tool for efficiently determining optimal characteristics of an environmental control system in the form of a nomograph that graphically charts relationships between variables that may impact the determination of optimal characteristics of an environmental control system. A more specific object of the invention is to provide a nomograph, and a method using the same, wherein variables that may impact the determination of optimal characteristics of an environmental control system are plotted on a single nomograph or table for all ranges of each variable, to allow the interpolation of the correct spot cooling or spot heating system for any given application.

It furtherance of these objectives, a method of the present invention is provided for sizing an environmental control system for controlling a temperature of a target. In general, one embodiment of the method of the present invention comprises the steps of: identifying the target that is to be temperature controlled by the environmental control system; selecting a desired temperature of the target that is to be temperature controlled; and determining optimal characteristics of the environmental control system to achieve said desired temperature. Preferably, the step of determining optimal characteristics of the environmental control system includes referring to a nomograph that charts numerical relationships of a plurality of variables. Preferably, variables charted on the nomograph include a temperature of discharge air that is to be discharged from the environmental control system, a temperature of ambient air surrounding the target, a distance between a discharge portion of the environmental control system and the target, and a volumetric flow rate of the discharge air.

In another aspect of the invention, a method of sizing an environmental control system generally comprises the steps of: identifying a target that is to be temperature controlled by the environmental control system; and determining optimal characteristics of the environmental control system by referring to a nomograph. In this aspect of the invention, the nomograph preferably charts relationships of a plurality of variables, including a temperature of discharge air that is to be discharged from the environmental control system, a temperature of ambient air surrounding the target, a distance between a discharge portion of the environmental control system and the target, a volumetric flow rate of the discharge air, and a desired temperature of the target that is to be temperature controlled.

In still another aspect of the invention, a nomograph for use in sizing an environmental control system comprises a graphic representation of relationships between a plurality of variables, including a temperature of discharge air that is to be discharged from the environmental control system, a temperature of ambient air surrounding the target, a distance between a discharge portion of the environmental control system and the target, and a volumetric flow rate of the discharge air.

In a further aspect of the invention, a nomograph for use in sizing an environmental control system is provided for controlling the temperature of a target using at least one duct that is adapted to discharge a non-isothermal compact air jet toward the target. Preferably, the nomograph comprises a graphic representation of relationships between a plurality of variables selected from a group consisting of a temperature of discharge air that is to be discharged from the environmental control system, a temperature of ambient air surrounding the target, a distance between a discharge portion of the environmental control system and the target, a volumetric flow rate of the discharge air, coverage area of the discharge air at the target that is to be temperature controlled, and a desired temperature of the target that is to be temperature controlled.

In yet another aspect of the invention, a nomograph is provided for use in determining a characteristic of a non-isothermal compact air jet discharged from a discharge duct of an environmental control system for controlling a temperature of a target at which the compact air jet is directed. Preferably, the nomograph comprises a graphic representation of a relationship between a range of values for said characteristic and a range of throw distances. Preferably, the value of the characteristic is a function of throw distance, for a specified discharge air temperature of the compact air jet, a specified volumetric flow rate of the compact air jet, and a specified ambient air temperature.

While the principal advantages and features of the present invention have been described above, a more complete and thorough understanding and appreciation of the invention may be attained by referring to the Figures and detailed description of the preferred embodiments, which follow.

BRIEF DESCRIPTION OF THE DRAWINGS

The accompanying Figures, which are incorporated in and form a part of the specification, illustrate exemplary embodiments of the present invention and, together with the description, serve to explain the principles of the invention.

DETAILED DESCRIPTION OF THE PREFERRED EMBODIMENTS

Figure 1:
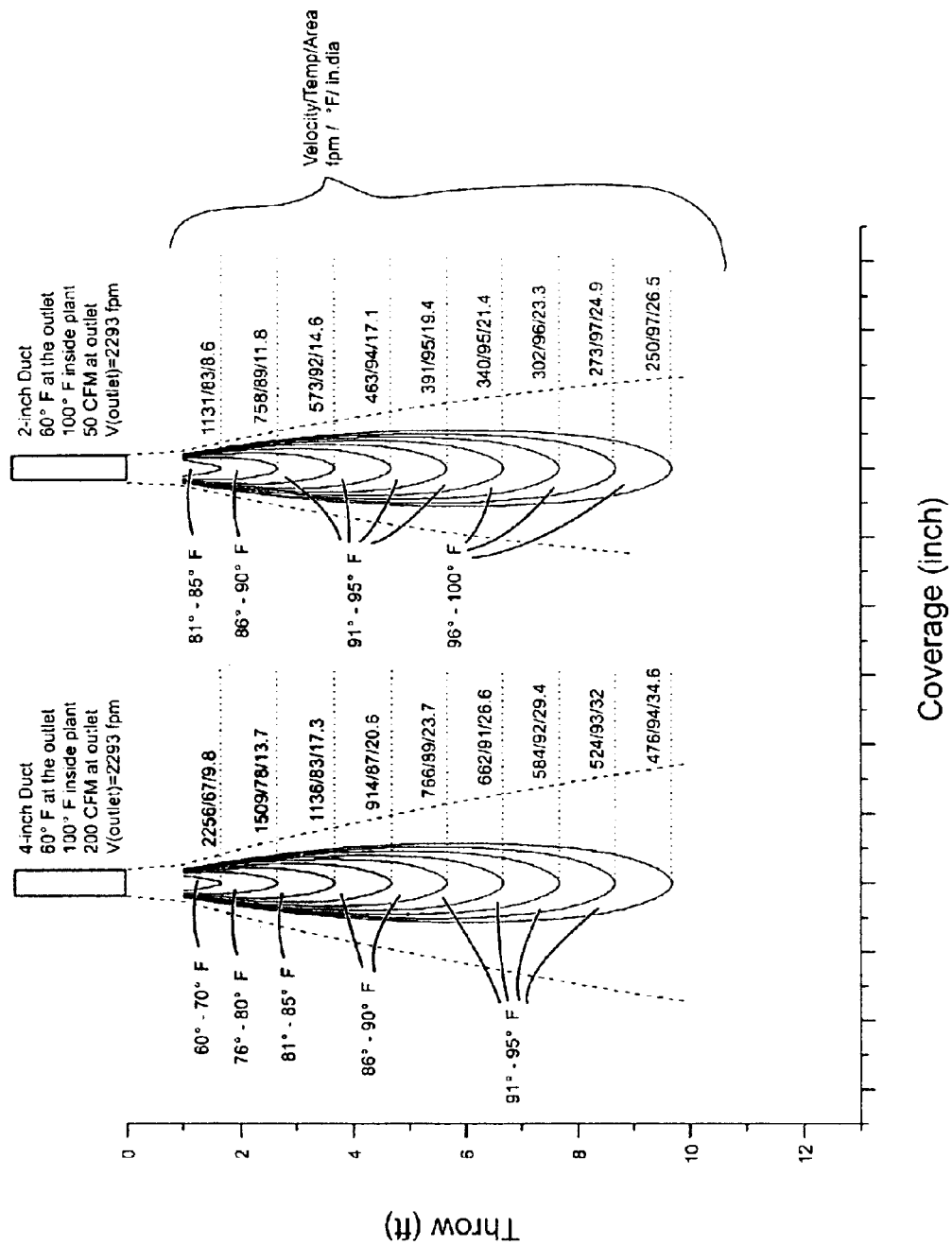
FIG. 1 illustrates a nomograph that may be used for determining characteristics of a non-isothermal compact air jet, charting relationships between throw distance, coverage area, velocity decay and temperature decay, for a specified discharge air temperature, a specified volumetric flow rate, and a specified ambient air temperature.

The specification, Figures and claims of this application relate generally to the use of "nomographs" as a tool for sizing or determining other optimal characteristics of an environmental control system. As used throughout the specification and claims of this application, the term "nomograph" is used to refer to any chart, table, graph, or other visually perceptible representation of numerical relationships of the various parameters and variables charted thereon. It should be understood that the scope and applicability of the present invention may extend beyond the particular embodiments and uses described and shown herein. However, in the interest of brevity and clarity, the invention that is defined by the following claims will be described hereinafter with reference to specific exemplary and preferred embodiments that are intended to be illustrative, but not limiting. Specifically, the invention is described with reference to methods and apparatus for sizing and determining other optimal characteristics of spot cooling and spot heating systems.

Spot cooling is the cooling of a specific target (e.g., a worker, a piece of equipment, etc.) or a specific area within a room, factory or other space, by delivering cool air directly to the target or "spot" that needs to be cooled. Similarly, spot heating is the heating of a specific target or area by delivering warm air directly to the target or "spot" that needs to be heated. Spot cooling and spot heating systems typically comprise an air supply source with a blower (such as an air conditioner for supplying cool air or a heating unit for supplying warm air, as is well known in the art), an main air plenum for conveying the cool or warm air supplied by the air supply source, and one or more air duct assemblies branching off from the main air plenum adjacent to the location or locations that are to be temperature controlled (e.g., at each workstation in a factory). Such duct assemblies may include flexible ducts or tubes for conveying air from the main air plenum toward the target(s) or area(s) that are to be spot cooled or spot heated. Such duct assemblies are also known in the art. The size and configuration of the system (including the tonnage of the air supply source, and the number and size of duct outlets branching from the main air plenum) will vary from application to application depending on a number of factors, including the number of workstations or other targets to be temperature controlled, the relative locations of the targets, factors affecting the ambient air temperature, such as heat generated by machinery, the local climate, etc.

Air supplied by currently utilized state-of-the-art spot cooling and spot heating systems is distributed by air jets referred to as "non-isothermal, compact jets." When air supplied to a space by a jet is of the same temperature as ambient air in the space, it is referred to as "isothermal jet." However, in the case of spot cooling and spot heating applications, the air supplied by the jets is not equal to the temperature of the ambient air, so the jets are referred to as "non-isothermal" jets. In currently utilized state-of-the-art spot cooling and spot heating systems, the air jets are formed by grilles, tubes, nozzles or other openings with relatively small aspect ratios. Thus, these jets are referred to as "compact jets." Preferably, the compact air jets are three dimensional and axi-symmetric, at least when initially discharged from the opening, so the maximum velocity and temperature difference relative to the ambient air in the cross section of the compact jets is along the axis. Characteristics of these jets in a room or other ambient space are influenced by a number of factors, such as reverse flows created by entrained air, other interfering air flows, inertial forces, velocity of the discharged air jets, cross-sectional area of the discharge opening(s), temperature differential, humidity, and thermal buoyancy, among others. These characteristics are governed by known air distribution other fluid mechanics principles.

As discussed above, the inventors herein have found that the primary factors that should be considered in designing an appropriate spot cooling or heating system for a given application include the desired temperature of the target, the temperature of discharge air that is to be discharged from the spot cooling or spot heating system toward the target, the temperature of the ambient air surrounding the target, the distance between the discharge duct(s) of the spot cooling or spot heating system and the target, the desired coverage area, the volumetric flow rate of the discharge air, the number and relative location(s) of targets to be temperature controlled by the system, and other factors that impact "velocity decay" (jet velocity is highest at the point of discharge and continuously decreases as the jet travels away from the point of discharge) and "temperature decay" (change in temperature as a non-isothermal jet travels away from the point of discharge) such as humidity, thermal buoyancy, air currents and other characteristics of the ambient environment surrounding the target.

The inter-relationships between these various factors are governed by known air distribution principles and other principles of fluid mechanics. For example, for vertically projected, non-isothermal, compact jets, "velocity decay" can be determined using the following equations:

$$Ar_o = g \Delta t_o H / T V_o^2$$

$$K_n = \{1 +/- (2.5 K_2 Ar_o / K_1^2)[x/(A_o)^{1/2}]^2\}^{1/3}$$

$$V_x/V_o = [K_n K_1 (A_o)^{1/2}]/x$$

where,
$Ar_o$=the local Archimedes number at the outlet,
g=the gravitational acceleration rate (115920 ft/min$^2$),
$\Delta t_o$=the temperature of supply air minus return air temperature (° F.),
$H_o$=the effective width of the diffuser (ft),
T=the mean absolute temperature of air (° R),
$V_o$=the average velocity at discharge (ft/min),
$K_n$=the coefficient of non-isothermality,
$K_1$=the centerline velocity decay constant of the jet,
$K_2$=the temperature decay constant of the jet,
$A_o$=effective area of diffuser (ft$^2$) (product of diffuser free area and discharge coefficient),
x=the distance away from diffuser (ft), and
$V_x$=the centerline velocity at x (ft/min).
Where the compact air jet is directed vertically downward, $Ar_o$ is positive because buoyant force is in the same direction as the initial direction of the compact air jet. According to the American Society for Heating, Refrigerating and Air-Conditioning Engineers (ASHRAE), for average discharge air velocities between 2,000 ft/min and 10,000 ft/min (a range within which the discharge velocity of a compact jet produced by a typical spot cooling or spot heating system would fall), it is known that the centerline velocity decay constant $K_1 \approx 7$, and it is also known that the temperature decay constant $K_2 \approx 0.85 K_1 \approx 6$. Reference, ASHRAE *Fundamentals* 2001. Thus, for a specified duct size, a specified discharge air temperature, a specified ambient air temperature, and a specified volumetric flow rate (and hence a specified discharge air velocity), these mathematical equations can be used to calculate velocity decay at a selected distance "x" away from the discharge opening.

For vertically projected, non-isothermal, compact jets, "temperature decay" can be determined using the following additional equations:

$$(T_x - T_r)/(T_o T_r) = K_2 (A_o)^{1/2}/(x) K_n$$

where,
$T_o$=the supply temperature at the diffuser (° F.),
$T_r$=the return temperature (° F.), and
$T_x$=the centerline temperature of the jet at distance x (° F.).
Thus, for a specified duct size, a specified discharge air temperature, a specified ambient air temperature, and a specified volumetric flow rate (and hence a specified discharge air velocity), this mathematical equation can be used to calculate temperature decay at a selected distance "x" away from the discharge opening.

For vertically projected, non-isothermal, compact jets, "coverage area" can be determined using the following equations:

$$r_{0.5V} = x \tan \theta$$

$$(r/r_{0.5V})^2 = 3.3 \log(V_x/V)$$

coverage diameter=2r where,
r=the radial distance of point under consideration from centerline of jet (inches),
$r_{0.5V}$=the radial distance in the same cross-sectional plane from axis to point where velocity is one-half the centerline velocity (inches),
V=the actual velocity of the point under consideration (ft/min), and
θ=the angle between $V_x$ and $0.5 V_x$.

According to ASHRAE, the average angle of divergence of a vertically projected, non-isothermal, compact jet is 22° Half of this value is the angle to the centerline (11°). "θ" is the angle where $V=0.5V_x$, which is 5.5°. Thus, for a specified duct size, a specified discharge air temperature, a specified ambient air temperature, and a specified volumetric flow rate (and hence a specified discharge air velocity), these mathematical equations can be used to calculate coverage diameter at a selected distance "x" away from the discharge opening.

FIG. 1 is illustrative of one embodiment of the present invention comprising a nomograph for use in determining characteristics of a non-isothermal compact air jet discharged from a discharge duct of an environmental control system for controlling a temperature of a target at which the compact air jet is directed. Specifically, FIG. 1 includes an exemplary nomograph for sizing a spot cooling systems that may utilize either 2-inch or 4-inch discharge air ducts, which discharge air having a discharge temperature of 60° F. into an ambient environment at 100° F. at volumetric flow rates of 50 cubic feet per minute (CFM) and 200 CFM, respectively. The nomograph of FIG. 1 charts relationships of maximum "throw" distance (i.e., distance between the discharge end of the discharge air duct and the target that is to be temperature controlled), coverage diameter, velocity decay and temperature decay, for the specified discharge air temperature, ambient air temperature, volumetric flow rates, and discharge duct diameters. In particular, FIG. 1 charts velocity decay profiles, temperature decay profiles and coverage areas, all as a function of throw distance, for a specified discharge air temperature, a specified volumetric flow rate, and a specified ambient air temperature. Ranges of these velocity decay, temperature decay and coverage area values and a range of throw distances are all charted on the exemplary nomograph of FIG. 1 in a manner so that an environmental control system designer can refer visually to the nomograph to determine velocity decay, temperature decay and coverage area for any selected throw distance, without manually calculating these characteristics. Within these ranges, all values for each of these characteristics are charted on the nomograph so that the designer can simply refer visually to the nomograph to determine a specific value for each characteristic for a variety of possible environmental control systems, regardless of throw distance, without engaging in the cumbersome, complicated, and error-prone exercise of manually calculating the specific value of each characteristic for each possible variation of a environmental control system to be designed.

Figure 2:
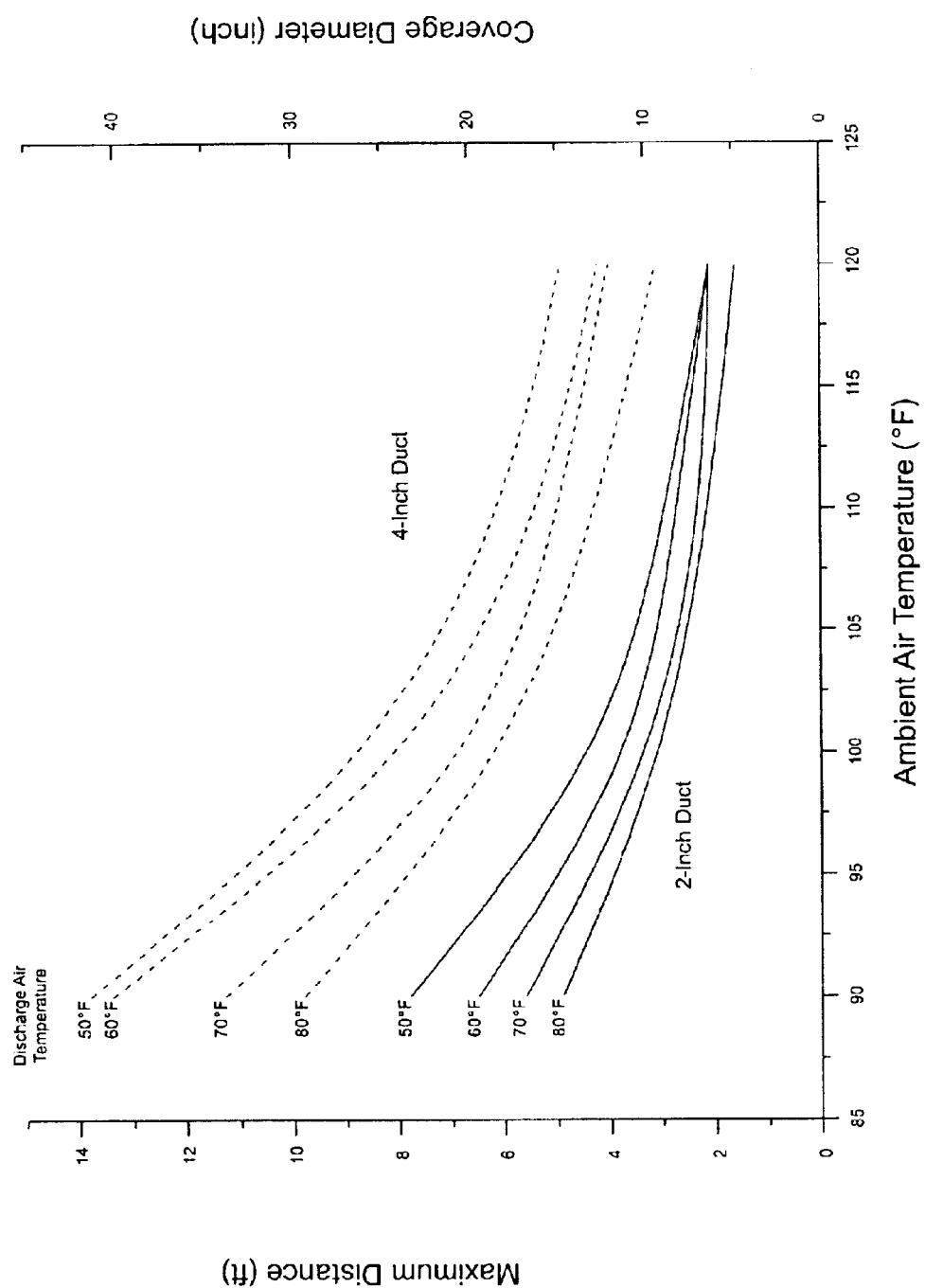
FIG. 2 illustrates a nomograph that may be used for sizing an environmental control system, charting relationships between discharge air temperature, ambient air temperature, maximum throw distance, and coverage diameter, for a specified volumetric flow rate of the discharge air.

FIG. 2 is illustrative of another embodiment of the present invention comprising a nomograph for use in sizing or determining other optimal characteristics of an environmental control system for controlling the temperature of a target. Specifically, FIG. 2 includes an exemplary nomograph for sizing a spot cooling systems that may utilize either 2-inch or 4-inch discharge air ducts, which discharge air at volumetric flow rates of 50 CFM and 200 CFM, respectively. The exemplary nomograph of FIG. 2 charts relationships of discharge air temperature, ambient air temperature, maximum "throw" distance, and coverage diameter, for the specified discharge duct diameters and volumetric flow rates of the discharge air. Ranges of these discharge air temperatures, ambient air temperatures, maximum throw distances, and coverage diameters are all charted on the exemplary nomograph of FIG. 2 in a manner so that an environmental control system designer can refer visually to the nomograph to determine values of these various characteristics, without manually calculating them. In the nomograph of FIG. 2, a range of maximum throw distances is charted along a Y-axis, a range of ambient air temperatures is charted along an X-axis, and numerical relationships of these ranges are represented by lines or curves plotted on the nomograph, wherein each line represents discharge air at a specific temperature and volumetric flow rate. Thus, within these ranges, all values for each of these characteristics are charted on the nomograph so that the designer can simply refer visually to the nomograph to determine a specific value for each characteristic for a variety of possible environmental control systems, regardless of the particular value of each characteristic, without engaging in the cumbersome, complicated, and error-prone exercise of manually calculating the specific value of each characteristic for each possible variation of a environmental control system to be designed.

Again, it should be understood that the particular values, ranges and system parameters shown in FIGS. 1 and 2 and described above are intended to be exemplary only. Other values, ranges and system parameters could be included in similar nomographs and used without departing from the scope of the present invention. For example, a nomograph similar to the nomograph of FIG. 1 could be used wherein different discharge air temperatures, volumetric flow rates, ambient air temperatures and/or duct diameters are specified. Also, nomographs could be used in a similar manner for determining optimal system characteristics of spot cooling or spot heating systems with different configurations, or for determining optimal system characteristics of other kinds of environmental control systems.

In accordance with the above, the present invention also provides a method for sizing an environmental control system for controlling a temperature of a target. In one embodiment, the method comprises the steps of: identifying the target that is to be temperature controlled by the environmental control system; selecting a desired temperature of the target that is to be temperature controlled; and determining optimal characteristics of the environmental control system to achieve said desired temperature by referring to a nomograph. Preferably, the nomograph, which is used in the step of determining optimal characteristics, charts numerical relationships of a plurality of variables, including a temperature of discharge air that is to be discharged from the environmental control system, a temperature of ambient air surrounding the target, a distance between a discharge portion of the environmental control system and the target, a volumetric flow rate of the discharge air, and coverage area of the discharge air at the target that is to be temperature controlled.

Thus, for example, the method of the present invention would permit a designer designing a spot cooling system to determine an optimal distance between a discharge duct and the target, to determine an optimal temperature of the discharge air that is to be discharged from the duct, to determine an optimal volumetric flow rate of the discharge air, and to determine a desired temperature of the target that is to be temperature controlled.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. However, as various modifications could be made in the invention described and illustrated without departing from the scope of the invention, it is intended that all matter contained in the foregoing description or shown in the accompanying Figures shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of sizing an environmental control system for controlling a temperature of a target, the method comprising the steps of:
   identifying the target that is to be temperature controlled by the environmental control system;
   selecting a desired temperature of the target that is to be temperature controlled; and
   determining optimal characteristics of the environmental control system to achieve said desired temperature by referring to a nomograph that charts numerical relationships of a plurality of variables, including a temperature of discharge air that is to be discharged from the environmental control system, a temperature of ambient air surrounding the target, a distance between a discharge portion of the environmental control system and the target, and a volumetric flow rate of the discharge air.

2. The method of claim 1 wherein the step of determining optimal characteristics of the environmental control system includes referring to a nomograph that charts numerical relationships of a plurality of variables, including coverage area of the discharge air at the target that is to be temperature controlled.

3. The method of claim 1 wherein the environmental control system is a spot cooling system for maintaining the desired temperature of the target locally, and wherein the step of selecting the desired temperature of the target includes selecting a desired temperature that is lower than the temperature of ambient air surrounding the target.

4. The method of claim 1 wherein the discharge portion of the environmental control system includes at least one duct adapted to discharge a non-isothermal compact air jet toward the target, and wherein the step of determining optimal characteristics of the environmental control system includes determining an optimal distance between the at least one duct and the target.

5. The method of claim 1 wherein the discharge portion of the environmental control system includes at least one duct adapted to discharge a non-isothermal compact air jet toward the target, and wherein the step of determining optimal characteristics of the environmental control system includes determining an optimal temperature of the discharge air that is to be discharged from the duct.

6. The method of claim 1 wherein the discharge portion of the environmental control system includes at least one duct adapted to discharge a non-isothermal compact air jet toward the target, and wherein the step of determining optimal characteristics of the environmental control system includes determining an optimal volumetric flow rate of the discharge air.

7. A method of sizing an environmental control system for controlling the temperature of a target, the method comprising the steps of:
   identifying the target that is to be temperature controlled by the environmental control system; and
   determining optimal characteristics of the environmental control system by referring to a nomograph that charts relationships of a plurality of variables, including a temperature of discharge air that is to be discharged from the environmental control system, a temperature of ambient air surrounding the target, a distance between a discharge portion of the environmental control system and the target, a volumetric flow rate of the discharge air, and a desired temperature of the target that is to be temperature controlled.

* * * * *